United States Patent
Bihani et al.

(10) Patent No.: US 10,664,495 B2
(45) Date of Patent: May 26, 2020

(54) SYSTEM AND METHOD FOR SUPPORTING DATA GRID SNAPSHOT AND FEDERATION

(71) Applicant: Oracle International Corporation, Redwood Shores, CA (US)

(72) Inventors: Ballav Bihani, Fremont, CA (US); Brian Keith Oliver, Burlington, MA (US); Chen Liu, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 316 days.

(21) Appl. No.: 14/866,585

(22) Filed: Sep. 25, 2015

(65) Prior Publication Data
US 2016/0092540 A1  Mar. 31, 2016

Related U.S. Application Data

(60) Provisional application No. 62/055,489, filed on Sep. 25, 2014.

(51) Int. Cl.
*G06F 16/27* (2019.01)
*G06F 16/25* (2019.01)

(52) U.S. Cl.
CPC .......... *G06F 16/278* (2019.01); *G06F 16/256* (2019.01)

(58) Field of Classification Search
CPC ............. G06F 2201/84; G06F 11/2097; G06F 11/1451; G06F 17/30566

(Continued)

(56) References Cited

U.S. PATENT DOCUMENTS

| 5,784,569 A | 7/1998 | Miller |
| 5,819,272 A | 10/1998 | Benson |

(Continued)

FOREIGN PATENT DOCUMENTS

EP  0928089 A2  7/1999

OTHER PUBLICATIONS

European Patent Office, International Searching Authority, International Search Report and Written Opinion dated Jan. 12, 2016 for International Application No. PCT/US2015/052060, 14 pages.

(Continued)

*Primary Examiner* — Jay A Morrison
*Assistant Examiner* — Ken Hoang
(74) *Attorney, Agent, or Firm* — Tucker Ellis LLP

(57) ABSTRACT

A system and method can support federation replication in a distributed computing environment. The system can provide one or more federation replication channels between a plurality of members in a first cluster and a plurality of members in a second cluster. Furthermore, a replication request can be transmitted from a federation coordinator to the plurality of members in the first cluster, wherein each said member in the first cluster owns a set of partitions. Then, the aggregated data for each said partition in the first cluster can be sent to the plurality of members in the second cluster via said one or more federation replication channels. Additionally, using the second cluster, the system can take a persistent snapshot of information on the plurality of members in the first cluster while the first cluster is operational.

16 Claims, 4 Drawing Sheets

(58) Field of Classification Search
USPC ......... 707/E17.005, 639, 649, 623, E17.032, 707/634, E17.007, 610, 802, E17.01, 707/E17.044, 609, 640, 654, 679, 707/E17.009, 600, 611, 622, 635, 638, 707/645, 659, 674, 678, 692, 698, 702, 707/703, 704, 713, 741, 769, 783, 827; 718/1, 104; 709/224, 226, 202, 209, 213, 709/217, 219, 221, 223; 711/E12.103, 711/162, 103, 114, E12.001, E12.008, 711/E12.022, E12.092, 112, 135, 163; 714/E11.073, 15, 19, 4.1, E11.023, 714/E11.024, E11.071, E11.122, 2, 37, 714/4.11, 4.12, 6.21

See application file for complete search history.

(56) References Cited

U.S. PATENT DOCUMENTS

| Patent/Publication | Date | Name | Classification |
|---|---|---|---|
| 5,940,367 A | 8/1999 | Antonov | |
| 5,991,894 A | 11/1999 | Lee | |
| 5,999,712 A | 12/1999 | Moiin | |
| 6,182,139 B1 | 1/2001 | Brendel | |
| 6,377,993 B1 | 4/2002 | Brandt | |
| 6,487,622 B1 | 11/2002 | Coskrey | |
| 6,490,620 B1 | 12/2002 | Ditmer | |
| 6,553,389 B1 | 4/2003 | Golding | |
| 6,615,258 B1 | 9/2003 | Barry | |
| 6,631,402 B1 | 10/2003 | Devine | |
| 6,693,874 B1 | 2/2004 | Shaffer | |
| 6,714,979 B1 | 3/2004 | Brandt | |
| 6,952,758 B2 | 10/2005 | Chron | |
| 6,968,571 B2 | 11/2005 | Devine | |
| 7,114,083 B2 | 9/2006 | Devine | |
| 7,139,925 B2 | 11/2006 | Dinker | |
| 7,260,698 B2 | 8/2007 | Hepkin | |
| 7,266,822 B1 | 9/2007 | Boudnik | |
| 7,328,237 B1 | 2/2008 | Thubert | |
| 7,376,953 B2 | 5/2008 | Togasaki | |
| 7,464,378 B1 | 12/2008 | Limaye | |
| 7,478,112 B2 * | 1/2009 | Dulay | G06F 17/30 707/200 |
| 7,543,046 B1 | 6/2009 | Champagne | |
| 7,698,390 B1 | 4/2010 | Harkness | |
| 7,720,971 B2 | 5/2010 | Moutafov | |
| 7,739,677 B1 | 6/2010 | Kekre | |
| 7,792,977 B1 | 9/2010 | Brower | |
| 7,814,248 B2 | 10/2010 | Fong | |
| 7,882,067 B2 | 2/2011 | Saika | |
| 7,953,861 B2 | 5/2011 | Yardley | |
| 8,195,835 B2 | 6/2012 | Ansari | |
| 8,209,307 B2 | 6/2012 | Erofeev | |
| 8,312,439 B2 | 11/2012 | Kielstra | |
| 8,397,227 B2 | 3/2013 | Fan | |
| 8,402,464 B2 | 3/2013 | Dice | |
| 8,595,714 B1 | 11/2013 | Hamer | |
| 9,262,323 B1 * | 2/2016 | Shankaran | G06F 16/184 |
| 9,501,544 B1 * | 11/2016 | Singhal | G06F 11/00 |
| 9,609,060 B2 | 3/2017 | Kan | |
| 2002/0035559 A1 | 3/2002 | Crowe | |
| 2002/0073223 A1 | 6/2002 | Darnell | |
| 2002/0078312 A1 | 6/2002 | Wang-Knop | |
| 2003/0023898 A1 | 1/2003 | Jacobs | |
| 2003/0046286 A1 | 3/2003 | Jacobs | |
| 2003/0120715 A1 | 6/2003 | Johnson | |
| 2003/0187927 A1 | 10/2003 | Winchell | |
| 2003/0191795 A1 | 10/2003 | Bernardin | |
| 2004/0024973 A1 | 2/2004 | Chron | |
| 2004/0059805 A1 | 3/2004 | Dinker | |
| 2004/0153615 A1 | 8/2004 | Koning | |
| 2004/0179471 A1 | 9/2004 | Mekkittikul | |
| 2004/0205148 A1 | 10/2004 | Bae | |
| 2004/0267897 A1 | 12/2004 | Hill | |
| 2005/0021737 A1 | 1/2005 | Ellison | |
| 2005/0083834 A1 | 4/2005 | Dunagan | |
| 2005/0097185 A1 | 5/2005 | Gibson | |
| 2005/0097294 A1 | 5/2005 | Hepkin | |
| 2005/0138460 A1 | 6/2005 | McCain | |
| 2005/0193056 A1 | 9/2005 | Schaefer | |
| 2006/0095573 A1 | 5/2006 | Carle | |
| 2007/0016822 A1 | 1/2007 | Rao | |
| 2007/0118693 A1 | 5/2007 | Brannon | |
| 2007/0140110 A1 | 6/2007 | Kaler | |
| 2007/0174160 A1 | 7/2007 | Solberg | |
| 2007/0198605 A1 | 8/2007 | Saika | |
| 2007/0237072 A1 | 10/2007 | Scholl | |
| 2007/0260714 A1 | 11/2007 | Kalmuk | |
| 2007/0271584 A1 | 11/2007 | Anderson | |
| 2008/0077622 A1 | 3/2008 | Keith | |
| 2008/0276231 A1 | 11/2008 | Huang | |
| 2008/0281959 A1 | 11/2008 | Robertson | |
| 2009/0144714 A1 | 6/2009 | Fan | |
| 2009/0265449 A1 | 10/2009 | Krishnappa | |
| 2009/0320005 A1 | 12/2009 | Toub | |
| 2010/0064341 A1 | 3/2010 | Aldera | |
| 2010/0128732 A1 | 5/2010 | Jiang | |
| 2010/0211931 A1 | 8/2010 | Levanoni | |
| 2010/0312861 A1 | 12/2010 | Kolhi | |
| 2010/0318584 A1 * | 12/2010 | Krishnaprasad | G06F 12/0253 707/813 |
| 2011/0041006 A1 | 2/2011 | Fowler | |
| 2011/0071981 A1 | 3/2011 | Ghosh | |
| 2011/0099147 A1 * | 4/2011 | McAlister | G06F 17/30581 707/639 |
| 2011/0107135 A1 | 5/2011 | Andrews | |
| 2011/0161289 A1 | 6/2011 | Pei | |
| 2011/0179231 A1 | 7/2011 | Roush | |
| 2011/0225359 A1 * | 9/2011 | Kulkarni | G06F 3/0607 711/114 |
| 2011/0249552 A1 | 10/2011 | Stokes | |
| 2011/0252192 A1 | 10/2011 | Busch | |
| 2012/0117157 A1 | 5/2012 | Ristock | |
| 2012/0158650 A1 | 6/2012 | Andre | |
| 2012/0197840 A1 * | 8/2012 | Oliver | G06F 17/30575 707/613 |
| 2012/0215740 A1 | 8/2012 | Vaillant | |
| 2012/0254118 A1 | 10/2012 | Shah | |
| 2012/0297056 A1 | 11/2012 | Lee | |
| 2013/0047165 A1 | 2/2013 | Goetz | |
| 2014/0173035 A1 | 6/2014 | Kan | |
| 2015/0019812 A1 * | 1/2015 | Ban | G06F 16/273 711/122 |
| 2015/0058293 A1 | 2/2015 | Kobayashi | |

OTHER PUBLICATIONS

European Patent Office, Examining Division, Communication pursuant to Article 94(3) EPC dated Sep. 4, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from: <http://digitalcommons.unl.edu/cgi/viewcontent.cgi?article=10668&context=csearticles>.

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

David Wong et al., "Java-based Mobile Agents", Communications of the ACM, Mar. 1999, vol. 42. No. 3, 11 pages.

United States Patent and Trademark Office, Office Action dated Aug. 8, 2017 for U.S. Appl. No. 15/200,908, 20 Pages.

United States Patent and Trademark Office, Office Action dated Jun. 14, 2018 for U.S. Appl. No. 15/200,908, 18 Pages.

United States Patent and Trademark Office, Office Action dated Apr. 18, 2019 for U.S. Appl. No. 15/200,908, 17 Pages.

Oracle International Corporation, "Oracle9i JDBC Developer's Guide and Reference", Release 1, Apr. 21, 2014, 3 pages.

* cited by examiner

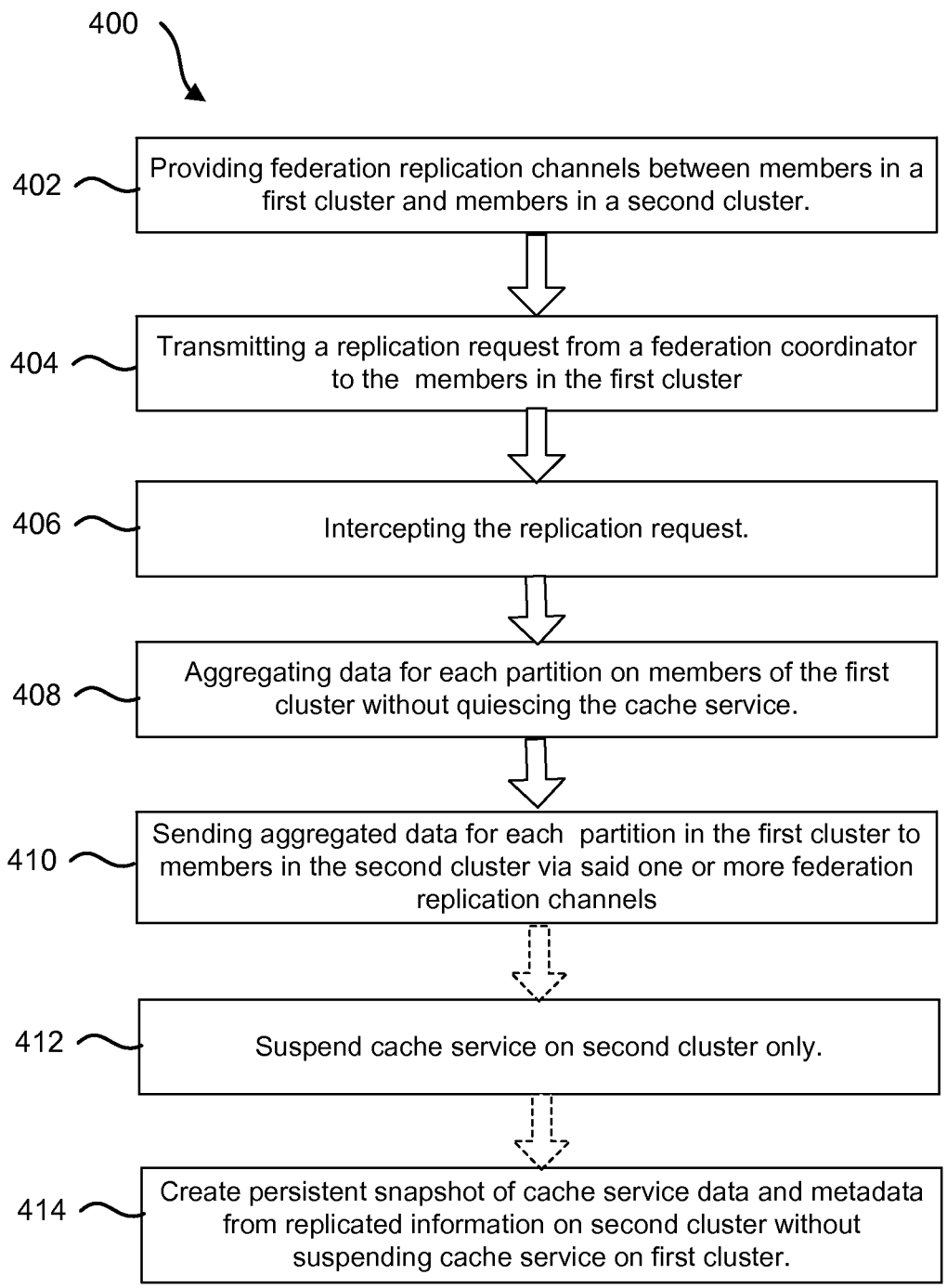

SYSTEM AND METHOD FOR SUPPORTING DATA GRID SNAPSHOT AND FEDERATION

CLAIM OF PRIORITY

This application claims priority to U.S. Provisional Patent Application No. 62/055,489, entitled "SYSTEM AND METHOD FOR SUPPORTING DATA GRID SNAPSHOT AND FEDERATION" filed Sep. 25, 2014, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed computing environment.

SUMMARY

Described herein are systems and methods that can support federation replication in a distributed computing environment. The system can provide one or more federation replication channels between a plurality of members in a first cluster and a plurality of members in a second cluster. Furthermore, a replication request can be transmitted from a federation coordinator to the plurality of members in the first cluster, wherein each said member in the first cluster owns a set of partitions. Then, the aggregated data for each said partition in the first cluster can be sent to the plurality of members in the second cluster via said one or more federation replication channels. Additionally, using the second cluster, the system can take a persistent snapshot of information on the plurality of members in the first cluster while the first cluster is operational.

In an embodiment, the present disclosure describes a method for supporting federation replication in a distributed computing environment. The method includes: providing one or more federation replication channels between a plurality of members in a first cluster and a plurality of members in a second cluster; transmitting a replication request from a federation coordinator to the plurality of members in the first cluster, wherein each said member in the first cluster owns a set of partitions; and sending aggregated data for each said partition in the first cluster to the plurality of members in the second cluster via said one or more federation replication channels. In an embodiment, the method also includes taking a snapshot for the plurality of members in the first cluster while the first cluster is operational.

These and other objects and advantages of the present invention will become apparent to those skilled in the art from the following description of the various embodiments, when read in light of the accompanying drawings.

BRIEF DESCRIPTION OF THE FIGURES

FIG. 4 illustrates a method supporting data grid federation and snapshot, in accordance with an embodiment of the invention.

DETAILED DESCRIPTION

Figure 1:
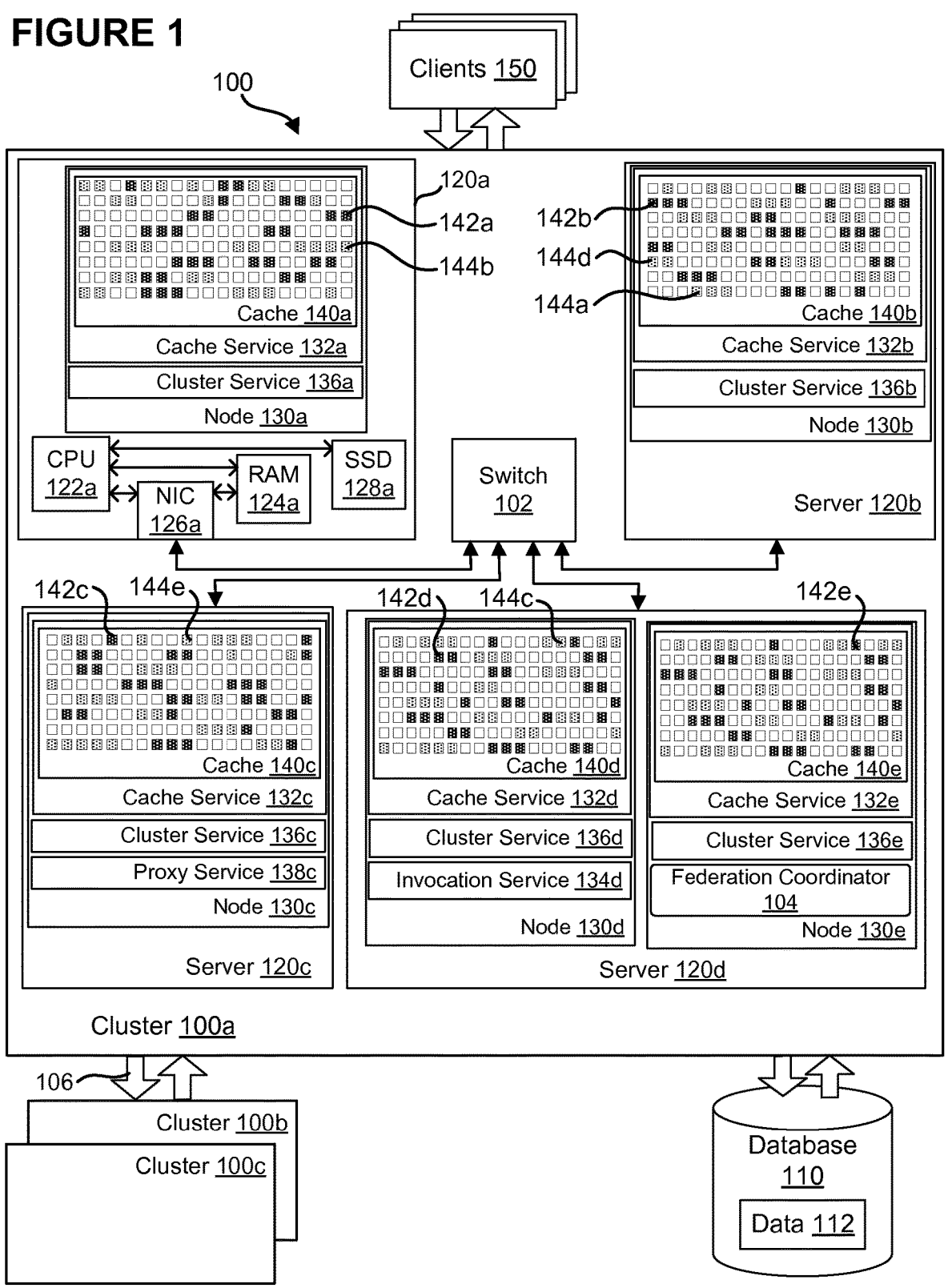
FIG. 1 illustrates a distributed data grid, in accordance with an embodiment of the invention.

Described herein are systems and methods that can support federation replication in a distributed computing environment, such as a distributed data grid. The systems and methods that can support federation replication in a distributed computing environment, such as a distributed data grid herein have particular utility in the distributed data grid described below with respect to FIG. 1. The systems and methods that can support federation replication in a distributed computing environment as disclosed herein may also be applied in wide variety of alternative distributed computing environments.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, and 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136*a*, 136*b*, 136*c*, 136*d*, 136*e*) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138*c*) allows connections (e.g. using TCP) from clients that run outside the cluster. The invocation Service (e.g., 134*d*) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132*a*, 132*b*, 132*c*, 132*d*, 132*e*) is the service which provides for data storage in the distributed data grid and is operative on all nodes of the cluster that read/write/store cache data, even if the node is storage disabled. The distributed cache service allows cluster nodes to distribute (partition) data across the cluster 100*a* so that each piece of data in the cache is managed primarily (held) by only one cluster node. The distributed cache service handles storage operation requests such as put, get, etc. The distributed cache service manages distributed caches (e.g., 140*a*, 140*b*, 140*c*, 140*d*, 140*e*) defined in a distributed schema definition and partitioned among the nodes of a cluster.

A partition is the basic unit of managed data in the distributed data grid and stored in the distributed caches (e.g., 140*a*, 140*b*, 140*c*, 140*d*, and 140*e*). The data is logically divided into primary partitions (e.g., 142*a*, 142*b*, 142*c*, 142*d*, and 142*e*), that are distributed across multiple cluster nodes such that exactly one node in the cluster is responsible for each piece of data in the cache. Each cache (e.g., 140*a*, 140*b*, 140*c*, 140*d*, and 140*e*) can hold a number of partitions. Each partition (e.g., 142*a*, 142*b*, 142*c*, 142*d*, 142*e*) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142*a*, 142*b*, 142*c*, 142*d*, and 142*e*) and one or more synchronized backup copy of the partition (e.g., light shaded squares 144*a*, 144*b*, 144*c*, 144*d*, and 144*e*). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142*a*, 142*b*, 142*c*, 142*d*, 142*e*) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120*a*, 120*b*, 120*c*, 120*d* such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory, performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments, the distributed data grid 100 implements systems and methods that can support federation replication in a distributed computing environment as described, for example, below and illustrated in FIG. 2. In particular embodiments, the distributed data grid 100 can support federated data features based on parallel asynchronous push replication technologies as described below. The federated data features enable synchronizing data between data grid clusters (potentially at different physical locations), and is beneficial in supporting disaster recovery, providing 24×7 availability, and reducing latency for regional users. The federated data features can be implemented as a federated cache service which is a version of the distributed cache service (see Cache service 132a, 132b, 132c, 132d, and 132e of FIG. 1) that replicates and synchronizes cached data across geographically dispersed clusters that are participants in a federation. Replication between cluster participants is controlled by the federation topology. A federated cache maintained by the federated cache service is a cache (data-structure) that in addition to permitting caching of cache entries, also permits the replication and later replay of insert/update and delete operations performed against said cache entries by an application (operating on one or more federation participants) to one or more other federation participants in the same federation.

Parallel asynchronous synchronization is a process providing synchronization functionality for federated data features implemented by the federated cache service. The distributed data grid can synchronize data changes between autonomous clusters. Furthermore, the system can track the data changes, which are applied to various user caches in the partitioned source cluster, at a partition level. Partition level journaling may be utilized to support synchronization functionality for federated data features implemented by the federated cache service. Different cluster members in the source cluster can work in parallel to synchronize data changes on different partitions to the cluster members in one or more destination clusters. At the cluster level, multiple cluster members in the source cluster can synchronize data changes to multiple cluster members in the destination cluster in parallel. At the partition level, the synchronization of the data changes always involves a source and a destination (i.e. a one-to-one relationship).

These and other features of parallel asynchronous synchronization for federated caching are described in more detail in U.S. patent application Ser. No. 14/467,310 titled "SYSTEM AND METHOD FOR SUPPORTING PARALLEL ASYNCHRONOUS SYNCHRONIZATION BETWEEN CLUSTERS IN A DISTRIBUTED DATA GRID" filed Aug. 25, 2014; U.S. patent application Ser. No. 14/467,308 titled "SYSTEM AND METHOD FOR SUPPORTING PARTITION LEVEL JOURNALING FOR SYNCHRONIZING DATA IN A DISTRIBUTED DATA GRID" filed Aug. 25, 2014; U.S. patent application Ser. No. 14/467,315 titled "SYSTEM AND METHOD FOR SUPPORTING RESETTABLE ACKNOWLEDGEMENTS FOR SYNCHRONIZING DATA IN A DISTRIBUTED DATA GRID" filed Aug. 25, 2014: and U.S. patent application Ser. No. 14/467,311 titled "SYSTEM AND METHOD FOR SUPPORTING FAILOVER DURING SYNCHRONIZATION BETWEEN CLUSTERS IN A DISTRIBUTED DATA GRID" filed Aug. 25, 2014, which applications are incorporated herein by reference.

A federated caching system can operate in conjunction with a server-side event model in a distributed data grid. Details of a server-side event model are described in U.S. patent application Ser. No. 13/462,719 titled "SYSTEM AND METHOD FOR SUPPORTING SERVER-SIDE EVENT MODEL IN A DISTRIBUTED DATA GRID" filed May 2, 2012 which is incorporated herein by reference. During the process of replication in the federated caching system, certain low-level events occur that an application, developer or monitoring/management tool may be interested in intercepting and handling in a custom manner. These include detecting when connections are made and lost, together with the ability to detect when connections are slow (there is backlog of replication/messages) and when connections are normal again.

These events are important as it allows applications to understand and potentially to control the volume operations being performed against a federated cache. Additionally events that capture when the replication of (batches of) operations is about to occur (prior to operations being sent to a participant) and when the "replay" of operations is about to occur may be intercepted and handled in a custom manner. These events are important as it provides the fundamental functionality allowing applications to override replication and replay, thus providing mechanism to resolve potential conflicts in replication. Accordingly such events are surfaced by the federated caching system for utilization in the server-side event model.

Federation Events are a set of events that represent the operations being performed by a federation service. Federation events include both federated connection events and federated change events. Federated connection events are related to the interaction of federated participants and federated change events are related to cache updates. Applications create and register event interceptors to consume federation events. Event interceptors handle the events and implement any custom logic as required. Events have different rules which govern whether or not mutable actions may be performed upon receiving the event.

Federated Connection Events include: CONNECTING which indicates that a connection is about to be initiated to a participant; DISCONNECTED which indicates that participant is no longer connected; BACKLOG_EXCESSIVE which indicates that a participant is backlogged (the participant has more work than it can handle); BACKLOG_NORMAL which indicates that a participant is no longer backlogged; and ERROR which indicates that an error occurred while applying changes on the remote participant or that the maximum connection retry has been reached.

Federated change events represent a transactional view of the changes that occur on the local cluster participant in a federation. The transaction is for a partition; that is, all changes that belong to a single partition are captured in a single FederatedChangeEvent object. Federated change events allow conflict resolution by allowing or disallowing changes to cache entries before they are committed. The following holds true when modifying entries: A lock is held for each entry during the processing of the event to prevent concurrent updates; and throwing an exception prevents the operation from being committed. Federate Change Events include: COMMITTING_LOCAL which indicates that entries are going to be inserted in the cache on the local participant; COMMITTING_REMOTE which indicates that entries from other participants are going to be inserted in the cache on the local participant; and REPLICATING which indicates that entries are going to be replicated to remote participants.

For example, consider an active-active topology whereby the same logical Cache Entry (in two participants) is being updated simultaneously by different applications connected to different participants. In this situation both participants would attempt to replicate their updates of the same logical Cache Entry to one another, possibly creating a conflicting update. To resolve this situation an application may simply "intercept" either the replication or replay events, detecting any application-level data conflicts, correcting the information prior to replication or replay occurring, essentially creating a "self-healing" system. In situations where "self healing" is not possible, the process of "interception" may simply mark the Cache Entries as being inconsistent, allowing a developer or administrator to report on and resolve the conflicts at a later point in time.

Federation (synchronization) allows for replicating data across different distributed data grid clusters, e.g. Oracle Coherence clusters, in a near real-time fashion. These clusters can be geographically dispersed across metropolitan area network (MAN) or wide area network (WAN). Federation provides the ability to synchronize cache instances across data grid cluster and thereby provides a reliable mechanism to synchronize distributed data grid cluster over a WAN/MAN. Federation can be implemented by asynchronously replicating updates from source caches in a first cluster to destination caches in a second cluster remote from the first cluster.

The ability to synchronize a first cluster with a second remote cluster provides a building block for disaster recovery because, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

Data Grid Federation Replication

As described above, a distributed data grid may be provided with federated data features which allows for replicating data across different distributed data grid clusters, e.g. Oracle Coherence clusters, in a near real-time fashion. Thus, each of cache service 132a, 132b, 132c, 132d, and 132e may be a federated version of a cache service. However, when performing a cold start of a remote cluster which is to be a member of a federated cache service it is initially necessary to replicate all of the data to the remote cluster. It is desirable to perform this initial replication of data without requiring quiescing the cache service on the source cluster or locking the data set on the source cluster for replication.

In accordance with an embodiment of the present invention, the distributed data grid implements a federation replication feature which and allows for seeding caches that belong to a remote federation service with all the data from the local cluster. The replication feature is useful during the performing of a cold start of a remote cluster where a large amount of data needs to be replicated to the remote cluster. The distributed data grid provide one or more federation replication channels 106 between a plurality of nodes in a first cluster (e.g. cluster 100a) and a plurality of members in a second cluster (e.g. cluster 100b). Furthermore, the distributed data gird 100 includes one or more federation coordinator 104 which can be implemented as a federated cache service on one or more nodes of the first and second cluster. A replication request can be transmitted from federation coordinator to the plurality of storage members in the first cluster, wherein each said member in the first cluster owns a set of partitions (e.g. nodes 130a, 130b, 130c, 130d, and 130e). Then, the aggregated data for each said partition in the first cluster 100a can be sent to the plurality of members (not shown) in the second cluster 100b via said one or more federation replication channels.

Figure 2:
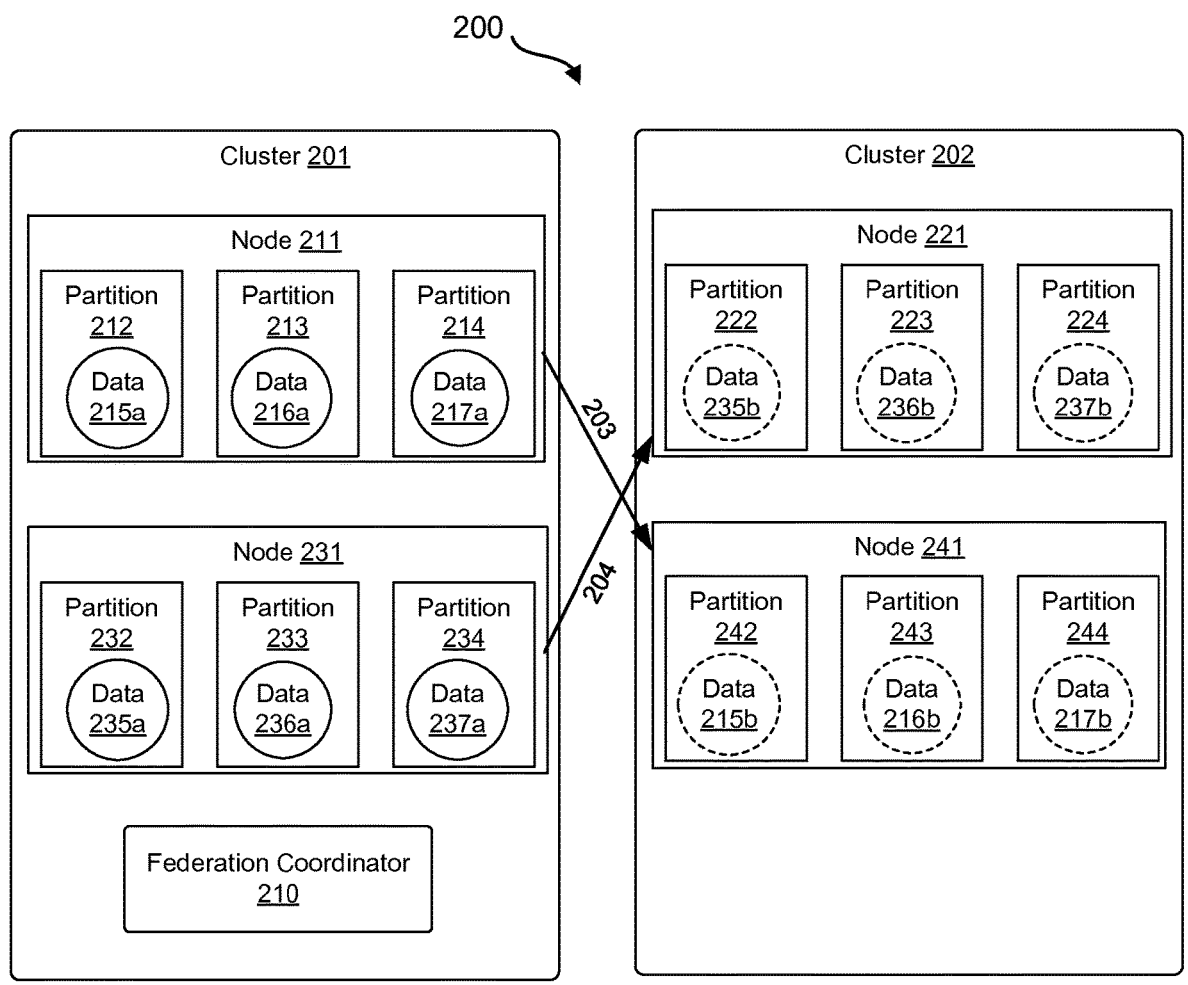
FIG. 2 illustrates a system supporting data grid federation and snapshot, in accordance with an embodiment of the invention.

FIG. 2 shows an illustration of federation replication in a distributed computing environment, in accordance with an embodiment of the invention. As shown in FIG. 2, the distributed computing environment 200 includes a local cluster 201 which includes a plurality of cluster members, e.g. nodes 211 and 231. Here, each of the nodes 211 and 231, which can be a storage-enabled member, owns a set of partitions in the cluster 201. As shown in FIG. 2, in the cluster 201, the node 211 owns the partitions 212, 213, 214 (with data 215a, 216a, 217a), and the node 231 owns the partitions 232, 233, 234 (with data 235a, 236a, 237a).

The distributed computing environment 200 also includes a remote cluster 202 which includes a plurality of cluster members 221 and 241. Remote cluster 202 is performing a cold start in order to join a federated cache service in cooperation with local cluster 201. Thus remote cluster 202 needs to be provided with all the data currently cached on local cluster 201.

In order to seed remote cluster 202 with data from local cluster 201 during the cold start of remote cluster 202, the distributed computing environment 200 can employ a federation coordinator 210 for supporting federation replication, which includes performing a replicate all operation on the cluster 201. The remote cluster 202 can generate a federation connection event indicating it is joining a federation as a federation participant. For example, the replicate all operation can be triggered via a JMX (Java Management Extensions) operation on a federation coordinator Management Bean in an Oracle® Coherence data grid. For example, the federated connection events CONNECTING indicates that a connection is about to be initiated to a participant and may be used to trigger a snapshot operation under certain conditions. Alternatively, an administrator may trigger a replicate all operation using a JMX administrator console. The replication operation initiates a replication request for all of the data on all of the nodes of the local cluster. Then, the replication request can be transmitted (or fanned) to all nodes (e.g. nodes 211 and 231) in the cluster 201.

Furthermore, in the cluster 202, the node 221 owns partitions 222, 223, 224, and the node 241 owns partitions 242-244. Cluster 202 is performing cold starts, this initially, the partitions are empty of data. For each of the partitions in the cluster 201 (i.e. the partitions 212, 213, 214 and 232, 233, and 234), a synchronization request can be added to a federation internal cache. Additionally, the federation internal cache can have a backup for safely completing pending replication requests in the case of node/machine failures.

In accordance with an embodiment of the invention, a federation service event interceptor can be triggered as part of storing the synchronization request. For each partition 212-214 and 232-234, the federation service event interceptor can intercept the newly added synchronization request and asynchronously aggregates all the key-values stored in the partition, before sending the aggregated data 215a, 216a, 217a and 235a, 236a, 237a to a member the remote cluster 202 (e.g. node 221 or 241) via the federation replication channels 203 or 204. After aggregation and transmission, copies 215b, 216b, 217b and 235b, 236b, 237b are replicated to the nodes 221, and 241 of the remote cluster 202.

Thus, in accordance with an embodiment of the invention, the system can replicate the entire data set in the local cluster 201 without quiescing the service on the source cluster 201 or locking the data set 215a, 216a, 217a and 235a, 236a, 237a for replication. Thus, the clients are able to mutate the source caches in the local cluster 201 while the remote cluster 202 is being seeded. Furthermore, the replication operation can be a light-weight operation with minimal resource impacts, since the system can replicate the data directly from the caches in the local cluster 201 to the remote cluster 202 without a need for making a copy to any internal federation cache. Also, the user can be aware of when the replication process is completed.

Figure 3:
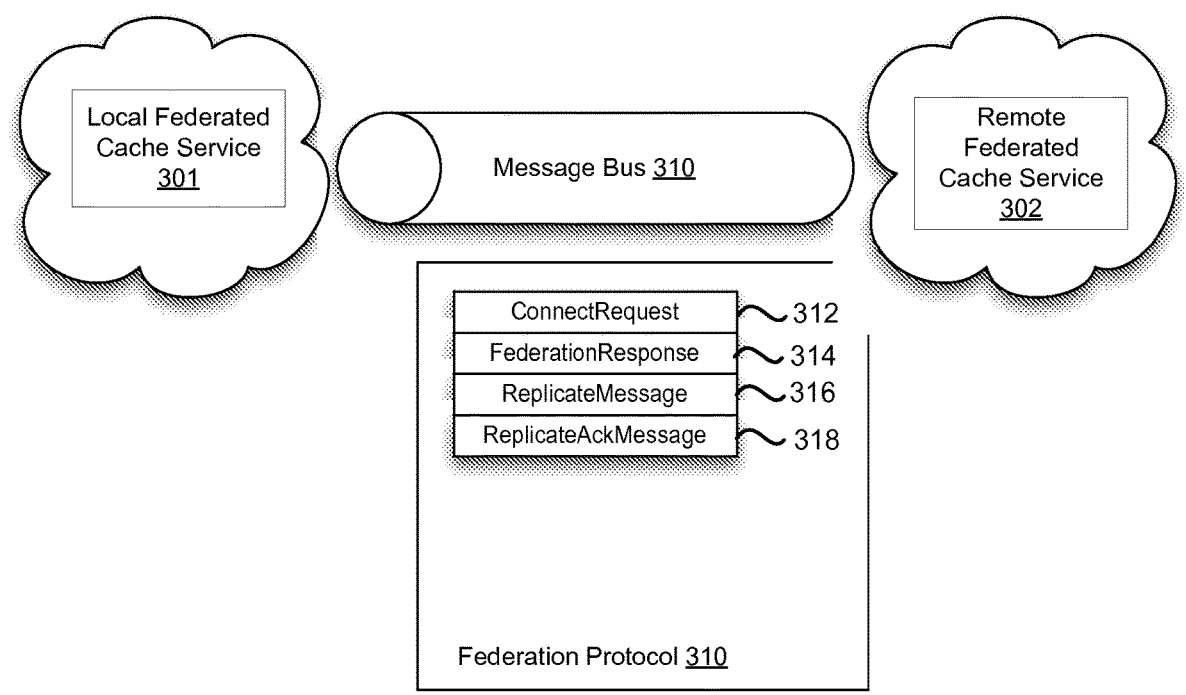
FIG. 3 illustrates a replication communication is a system for supporting data grid federation and snapshot, in accordance with an embodiment of the invention.

FIG. 3 illustrates communication between a local federated cache service 301 and a remote federated cache service 302 when sending aggregated data using a federation snap shot feature in accordance with an embodiment of the invention. As described above, the snapshot operation initiates a replication request for all of the data on all of the nodes of the local cluster. Then, the replication request can be transmitted (or fanned) to all nodes in the cluster. For each partition, the federation service event interceptor intercepts the newly added synchronization request and asynchronously aggregates all the key-values stored in the partition, before sending the aggregated data to a member the remote cluster via the federation replication channels. FIG. 3 illustrates communication over a federation replication channel in the form of message bus 310.

As shown in FIG. 3, local federated cache service 301 communicates with remote federated cache service 302 over a message bus 310. Federation protocol 310 is used for communication of aggregated data from local federated cache service 301 to remote federated cache service 302. Remote federated cache service 302 initiates using a federation snap shot feature by sending connect request 312 indicating that it wasn't to connect to the federation as a federation participant. Local federated cache service 301 responds to the connect request 312 with federation response 314. Local federated cache service 301 then sends one or more replicate message 316 including aggregated data to seed the cache or remote federated cache service 302. Remote federated cache service 302 then sends an Acknowledgement message 318 acknowledging receipt of each replicate message 316. Replicate messages are resent if not acknowledge. Replicate messages are sent until the cache of remote federated cache service 302 is fully seeded with the aggregated data from the cache of local cache service 301.

FIG. 4 illustrates a method 400 supporting data grid snapshot and federation, in accordance with an embodiment of the invention. In an embodiment, the present disclosure describes a method 400 for supporting federation replication in a distributed computing environment. The method 400 includes at step 402 providing one or more federation replication channels between a plurality of members in a first cluster and a plurality of members in a second cluster. Then at step 404, transmitting a replication request from a federation coordinator to the plurality of members in the first cluster, wherein each said member in the first cluster owns a set of partitions. Then at step 406, the federation service event interceptor on each member intercepts the aggregation request. Then at step 408, the federation service on each member asynchronously aggregates all the key-values stored in the partition. Then at step 410, the federation service on each member of the first cluster sends aggregated data for each partition in the first cluster to the plurality of members in the second cluster via said one or more federation replication channels. In an embodiment, the method also includes taking a snapshot for the plurality of members in the first cluster while the first cluster is operational i.e. without quiescing and/or interrupting the cache service provided by the first cluster to clients.

Persistent Snapshot Using Federation Replication

In some situations, it may be necessary or desirable to make a persistent snapshot of a data grid cluster. A distributed data grid can support various cache services using an in-memory data store. The system allows a user to use a management tool to take a snapshot of the system on the in-memory data store that supports the cache services on-demand, at any particular time. For example, the snapshot can be used to make a backup of the system overnight. In prior embodiments the system suspended the cache services, prior to taking the snapshot. Thus, the system provided a consistent point in time for taking the snapshot. Then, the cache service was be resumed after the snapshot was taken. The snapshot provided a consistent view of each partitioned cache service. For example, the snapshot can provided a catalogue of state information of the running system, including metadata and cache data for the cache services. Additionally, the system could store/persist the snapshot either in a central location such as a storage area network or in distributed local disks. U.S. patent application Ser. No. 14/271,161 titled "SYSTEM AND METHOD FOR SUPPORTING PERSISTENT SNAPSHOT OF A RUNNING SYSTEM IN A DISTRIBUTED DATA GRID" filed Jun. 18, 2015.

However the prior system method for persistent snapshotting was disadvantageous in that it required suspending the cache services, prior to taking the snapshot and resuming after the snapshot was complete. Thus, for the duration of the snapshot process, the cache service was unavailable. However, using federation replication, the of state information of the running system, including metadata and cache data for the cache services can be replicated from a first cluster to a second cluster, as described above, without shutting down the cache service on the first cluster. Then, the cache service on the second cluster only, can be suspended prior to taking the snapshot of the second cluster. Thus, the system provides a consistent point in time for taking the snapshot. Thus also, the cache service on the first cluster never needs to be suspended. The cache service on the second cluster can be resumed (and resynchronized) after the snapshot is completed. This allows a persistent snapshot to be created providing a consistent view of each partitioned cache service on the first cluster without ever shutting down the cache service on the first cluster.

As shown in FIG. 4, for example, after replication of data and metadata from the first cluster to the second cluster, at step 412, the cache service on the second cluster only, can be suspended prior to taking the snapshot of the second cluster. Then, at step 414, a persistent snapshot of cache service data and metadata from replicated information can be created on second cluster without suspending the cache service on first cluster. This allows a persistent snapshot to be created providing a consistent view of each partitioned cache service on the first cluster without ever shutting down the cache service availability to clients from the first cluster.

Additionally, the replication operation is a light-weight operation with minimal resource impacts of the first cluster, because the system can replicate the data directly from the caches in the first cluster to the second cluster without a need for making a copy to any internal federation cache. Thus, the snapshot feature implemented on the second cluster allows a user to make a persistent copy of a distributed data grid, while the first cluster is fully operational, with minimal impact to clients of the first cluster. Also, the user can be aware of when the replication and snapshot process is completed.

Ina an Oracle® Coherence distributed data grid, snapshots can be used to backup and restore caches. The persistence statements rely on the persistence settings that are configured for a service. A CREATE SNAPSHOT statement persists the data partitions of a service to disk. A VALIDATE SNAPSHOT statement is used to check whether a snapshot is complete and without error. The RECOVER SNAPSHOT statement restores the data partitions of a service from disk. If the service has not been explicitly suspended, then: the service is suspended; the snapshot recovered; and the service is resumed. Any existing data in the caches of a service are lost. A service argument is used to specify the name of the partitioned or federated cache service for which the snapshot is\was created. The ARCHIVE SNAPSHOT statement saves a snapshot to a central location. The location is specified in the snapshot archiver definition that is associated with a service. The RETRIEVE ARCHIVED SNAPSHOT statement is used to retrieve an archived snapshot so that it can be recovered using the RECOVER SNAPSHOT statement. The REMOVE SNAPSHOT statement is used to delete a snapshot or an archived snapshot from disk. The SUSPEND SERVICE and RESUME SERVICE commands are used to ensure persistence operations are performed on a non-active service. For some persistence operations, the service is automatically suspended and resumed when the statement is executed. In embodiments of the present invention the service is suspended (or never started) on the second cluster after federation replication—thus allowing the service to continue to be provided on the first cluster without suspension.

Federation Participation and Topology

As described above, a federated cache service is a version of the distributed cache service (see Cache service 132*a*, 132*b*, 132*c*, 132*d*, and 132*e* of FIG. 1) that replicates and synchronizes cached data across geographically dispersed clusters that are participants in a federation. Replication between clusters participants is controlled by the federation topology. A federated cache maintained by the federated cache service is a cache (data-structure) that in addition to permitting caching of cache entries, also permits the replication and later replay of insert/update and delete operations performed against said cache entries by an application (operating on one or more federation participants) to one or more other federation participants in the same federation. Each federation participant is typically a collection of one or more nodes operating one or more computers, often a cluster, arranged for the purpose of offering a known and named service (i.e. operating as members of a clustered service) and/or for managing a set of data as a single unit. For example a cluster (consisting of many cluster members/nodes running on servers) may be considered a single federation participant (e.g. each of cluster 100*a*, 100*b* and 100*c* of FIG. 1). Alternatively, an individual cluster member/node running on a computer server may be considered to be a single federation participant (e.g. each of server 120*a*, 120*b*, 120*c*, and 120*d* of FIG. 1). A federation is collection of two or more federation participants.

A federation topology defines the manner in which federation participants are connected in terms of the direction of replication and semantics (rules) for replay of operations performed against a federated cache using said topology. An "active-active" topology specifies that all operations performed on a federated cache in one participant will be replicated to all other participants. An "active-passive" topology specifies that all operations performed on a federated cache in an "active" participant will be replicated to all other participants. Operations performed against any "passive" participants will not be replicated to other participants. A "hub-spoke" topology specifies that all operations performed on a federated cache in the participant designated as the "hub" will be replicated to the participants designated as "spoke" participants. Operations performed against the "spoke" participants will not be replicated to other participants. A "centralized" topology specifies that all operations performed on a federated cache in the participant designated as the "central" participant will be replicated to the participants designated as "leaf" participants. Operations performed against the "leaf" participants will be replicated only to the "central" participant, which may then in turn replicate the operations to other "leaf" participants. There's no direct "leaf-to-leaf" participant replication. In a "custom" topology participants are designated as either "senders", "receivers" or "repeaters". "Senders" will always "send" operations to other participants. "Receivers" will only ever "receive" operations (and replay them locally). "Repeaters" will both receive and send operations. All of the above topologies can be represented using these fundamental concepts.

The federation replication features described herein may be utilized for replicating data for cold start of remote cluster in any of the above topologies. Similarly federation replication and snapshot can be utilized to ensure a consistent snapshot so long as the cluster which is suspend to make the snapshot is guaranteed to be consistent with all other clusters at the point of suspension. In a distributed system with multiple active participants, this may require a short period of suspension of one or more active participants to ensure synchronization with the snapshot cluster has time to complete before suspension and snapshot operation begin. However the suspension time to allow synchronization to occur will be minimal compared to a suspension for the entire duration of a snapshot process which need only be performed on one cluster.

While various embodiments of the present invention have been described above, it should be understood that they have been presented by way of example, and not limitation. It will be apparent to persons skilled in the relevant art that various changes in form and detail can be made therein without departing from the spirit and scope of the invention.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting federation replication in a distributed computing environment, the method comprising:
providing a first plurality of members in a first cluster of the distributed computing environment and a second plurality of members in a second cluster of the distributed computing environment, wherein each member of the first and second plurality of members in the first and second clusters comprises a distributed cache, and wherein each distributed cache of each member of the first and second plurality of members in the first and second clusters comprises a plurality of data partitions that store a datum and a key as a key-value pair;
providing one or more federation replication channels between the first plurality of members in the first cluster and the second plurality of members in the second cluster;
providing a federated cache service to each of the first plurality of members in the first cluster, the federated cache service comprising federation data features operable to maintain selected distributed caches of the first plurality of members as federated caches;
initiating, by a federation coordinator, a replication request for replicating each of the data partitions of each distributed cache of each member in the first plurality of members;
transmitting the replication request from the federation coordinator to each of the first plurality of members in the first cluster;
intercepting the replication request by federation service event interceptors of the federated cache service;
asynchronously aggregating, by the federated cache service, the key-value pair of each data partition of each of the federated caches;

sending by the federated cache service the aggregated key-value pairs of each data partition of each of the federated caches in the first cluster to the second plurality of members in the second cluster via said one or more federation replication channels without:
quiescing the federated cache service in the first cluster, or
locking data of the federated caches in the first cluster; and
seeding the data partitions of each distributed cache of each of the second plurality of members in the second cluster with the aggregated key-value pairs of each data partition of each of the federated caches in the first cluster.

2. The method of claim 1, further comprising:
taking a snapshot for the plurality of members in the first cluster while the first cluster is operational.

3. The method of claim 1, further comprising:
taking a snapshot for the plurality of members in the first cluster while the first cluster is operational by suspending the second cluster after it receives the aggregated data from the first cluster and then performing a snapshot operation on the second cluster.

4. The method of claim 1, further comprising:
taking a snapshot for the plurality of members in the first cluster while the first cluster is operational by suspending the second cluster after it receives the aggregated data from the first cluster and then performing a snapshot operation on the second cluster; and
resuming the second cluster after completion of the snapshot operation and resynchronizing the second cluster with the first cluster.

5. The method of claim 1, further comprising:
initiating federation replication upon cold start up of said second cluster.

6. The method of claim 1, further comprising:
initiating federation replication upon detecting an initial connection event from said second cluster.

7. The method of claim 1, further comprising:
initiating federation replication in response to administrator input to a management console.

8. The method of claim 1, wherein the distributed computing environment is a distributed data grid.

9. A system for supporting federation replication in a distributed data grid, the system comprising:
a first cluster comprising a first plurality of server nodes operating on a first plurality of computer systems each comprising a microprocessor and a memory, wherein each of the first plurality of server nodes owns a set of data partitions, and wherein each data partition in the set stores a datum and a key as a key-value pair;
a second cluster comprising a second plurality of server nodes operating on a second plurality of computer systems each comprising a microprocessor and a memory;
one or more federation replication channels between the plurality of server nodes in the first cluster and the plurality of server in the second cluster;
a federated cache service at each of the first plurality of server nodes of the first cluster, the federated cache service comprising federation data features operable to maintain selected caches of the first plurality of server nodes as federated caches; and
a federation coordinator configured to send a replication request to the plurality of server nodes in the first cluster, wherein a federation service event interceptor of the federated cache service intercepts the replication request,
wherein, the federated cache service asynchronously aggregates the key-value pair of each data partition each of the federated caches,
wherein each of said first plurality of server nodes is configured such that, in response to receiving the replication request, said each of the federated cache service sends the aggregated key-value pair data for every partition owned by said each of said first plurality of server nodes to one of the second plurality of server nodes in said second cluster via said one or more federation replication channels without:
quiescing the cache service in the first cluster, or
locking data of the federated caches in the first cluster,
wherein the data partitions of each distributed cache of each of the second plurality of members in the second cluster is seeded with the aggregated key-value pairs of each data partition of each of the federated caches in the first cluster.

10. The system of claim 9, wherein:
said second cluster is configured to support taking a snapshot for the plurality of server nodes in the first cluster while the first cluster is operational.

11. The system of claim 9, wherein:
said second cluster is configured to support taking a snapshot for the plurality of server nodes in the first cluster while the first cluster is operational by suspending the second cluster after it receives the aggregated data from the first cluster and then performing a snapshot operation on the second cluster.

12. The system of claim 11, wherein:
said second cluster is configured to support taking a snapshot for the plurality of server nodes in the first cluster while the first cluster is operational by suspending the second cluster after it receives the aggregated data from the first cluster and then performing a snapshot operation on the second cluster;
said second cluster is configured to resume operation of the second cluster after completion of the snapshot operation; and
said second cluster is configured to resynchronize with the first cluster after resuming operation.

13. The system of claim 9, wherein the system is configured to initiate federation replication upon cold start-up of said second cluster.

14. The system of claim 9, wherein the system is configured to initiate federation replication upon detecting an initial connection event from said second cluster.

15. The system of claim 9, wherein the system is configured to initiate federation replication in response to administrator input to a management console.

16. A non-transitory computer readable medium including instruction stored thereon for supporting federation replication in a distributed computing environment, which instructions, when executed, configure nodes in the distributed computing environment to perform steps comprising:
providing a first plurality of members in a first cluster of the distributed computing environment and a second plurality of members in a second cluster of the distributed computing environment, wherein each member of the first and second plurality of members in the first and second clusters comprises a distributed cache, and wherein each distributed cache of each member of the first and second plurality of members in the first and second clusters comprises a plurality of data partitions that store a datum and a key as a key-value pair;

providing one or more federation replication channels between the first plurality of members in the first cluster and the second plurality of members in the second cluster;

providing a federated cache service to each of the first plurality of members in the first cluster, the federated cache service comprising federation data features operable to maintain selected distributed caches of the first plurality of members as federated caches;

initiating, by a federation coordinator, a replication request for replicating each of the data partitions of each distributed cache of each member in the first plurality of members;

transmitting the replication request from the federation coordinator to each of the first plurality of members in the first cluster;

intercepting the replication request by federation service event interceptors of the federated cache service;

asynchronously aggregating, by the federated cache service, the key-value pair of each data partition of each of the federated caches;

sending by the federated cache service the aggregated key-value pairs of each data partition of each of the federated caches in the first cluster to the second plurality of members in the second cluster via said one or more federation replication channels without:
  quiescing the cache service in the first cluster, or
  locking data of the federated caches in the first cluster; and seeding the data partitions of each distributed cache of each of the second plurality of members in the second cluster with the aggregated key-value pairs of each data partition of each of the federated caches in the first cluster.

* * * * *

UNITED STATES PATENT AND TRADEMARK OFFICE
CERTIFICATE OF CORRECTION

PATENT NO. : 10,664,495 B2
APPLICATION NO. : 14/866585
DATED : May 26, 2020
INVENTOR(S) : Bihani et al.

It is certified that error appears in the above-identified patent and that said Letters Patent is hereby corrected as shown below:

On the Title Page

On page 2, Column 2, under Other Publications, Line 5, delete "Hetergeneous" and insert -- Heterogeneous --, therefor.

In the Drawings

On sheet 4 of 4, in FIGURE 4, under Reference Numeral 404, Line 2, delete "cluster" and insert -- cluster. --, therefor.

On sheet 4 of 4, in FIGURE 4, under Reference Numeral 410, Line 3, delete "channels" and insert -- channels. --, therefor.

In the Specification

In Column 4, Line 6, delete "servers" and insert -- servers. --, therefor.

In Column 13, Line 20, after "was" delete "be".

In Column 13, Line 32, after "system" insert -- and --.

In Column 13, Line 37, delete "the of state" and insert -- the state --, therefor.

In Column 14, Line 7, delete "Ina" and insert -- In --, therefor.

In the Claims

In Column 18, Line 5, in Claim 9, after "partition" insert -- of --.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*

In Column 18, Line 9, in Claim 9, after "each" delete "of the".

In Column 18, Line 34, in Claim 12, delete "claim 11," and insert -- claim 9, --, therefor.